United States Patent
Cooper et al.

(10) Patent No.: US 8,589,238 B2
(45) Date of Patent: Nov. 19, 2013

(54) SYSTEM AND ARCHITECTURE FOR MERCHANT INTEGRATION OF A BIOMETRIC PAYMENT SYSTEM

(75) Inventors: Brian Cooper, Suwanee, GA (US); Ron Hilmes, Danville, CA (US)

(73) Assignee: Open Invention Network, LLC, Durham, NC (US)

( * ) Notice: Subject to any disclaimer, the term of this patent is extended or adjusted under 35 U.S.C. 154(b) by 1131 days.

(21) Appl. No.: 11/421,451

(22) Filed: May 31, 2006

(65) Prior Publication Data

US 2007/0288320 A1 Dec. 13, 2007

(51) Int. Cl.
*G06Q 20/00* (2012.01)
*G06Q 10/00* (2012.01)

(52) U.S. Cl.
USPC .................. 705/18; 705/1.1; 705/16; 705/64

(58) Field of Classification Search
None
See application file for complete search history.

(56) References Cited

U.S. PATENT DOCUMENTS

| | | | |
|---|---|---|---|
| 5,613,012 A | 3/1997 | Hoffman et al. | |
| 5,615,277 A | 3/1997 | Hoffman | |
| 5,802,199 A | 9/1998 | Pare et al. | |
| 5,930,804 A * | 7/1999 | Yu et al. | 707/104.1 |
| 6,163,771 A * | 12/2000 | Walker et al. | 705/18 |
| 6,269,348 B1 | 7/2001 | Pare, Jr. et al. | |
| 6,327,578 B1 * | 12/2001 | Linehan | 705/65 |
| 6,539,101 B1 | 3/2003 | Black | |
| 6,879,966 B1 | 4/2005 | Lapsley et al. | |
| 6,950,810 B2 | 9/2005 | Lapsley et al. | |
| 6,991,160 B2 | 1/2006 | Demere | |
| 7,392,388 B2 * | 6/2008 | Keech | 713/170 |
| 7,536,352 B2 | 5/2009 | Lapsley et al. | |
| 2001/0051924 A1 | 12/2001 | Uberti | |
| 2002/0194124 A1 * | 12/2002 | Hobbs et al. | 705/39 |
| 2003/0061172 A1 | 3/2003 | Robinson | |
| 2004/0103063 A1 * | 5/2004 | Takayama et al. | 705/41 |
| 2004/0117302 A1 * | 6/2004 | Weichert et al. | 705/40 |
| 2005/0144133 A1 | 6/2005 | Hoffman et al. | |
| 2005/0187883 A1 | 8/2005 | Bishop et al. | |
| 2005/0289058 A1 | 12/2005 | Hoffman et al. | |
| 2006/0106734 A1 | 5/2006 | Hoffman et al. | |

FOREIGN PATENT DOCUMENTS

EP   1 736 943 A1   12/2006

\* cited by examiner

*Primary Examiner* — Asfand Sheikh
(74) *Attorney, Agent, or Firm* — Haynes and Boone, LLP

(57) ABSTRACT

A system and method for performing authentication are disclosed. The system may include a shared central processing server, a plurality of software components each residing in a corresponding point-of-sale (POS) workstation and an identity provider service. The server may reside at a merchant location and communicate with multiple POS workstations at the merchant location. The server may be configured to receive biometric information from each POS workstation. Each software component may communicate with a biometric sensor in communication with the corresponding POS workstation to receive biometric information. The identity provider service may be configured to communicate with the server, store registered biometric information and compare biometric information received from the server with one or more of the stored registered biometric information. One of the biometric sensor, a POS workstation and the server may convert a biometric image into a biometric template for comparison with the stored registered biometric information.

10 Claims, 8 Drawing Sheets

# SYSTEM AND ARCHITECTURE FOR MERCHANT INTEGRATION OF A BIOMETRIC PAYMENT SYSTEM

BACKGROUND

Conventional merchant payment systems typically include one or more point-of-sale workstations ("POS workstations"), such as an electronic cash register ("ECR") that may be coupled to a payment terminal, such as a PIN pad card reader ("PIN pad") to accommodate credit and debit card payments from consumers. The ECR is coupled through a network connection (e.g., broadband connection or dial-up connection) at the merchant location in order to interact with remote card payment processing systems to process credit card and debit card transactions initiated by consumers for settlement. A merchant may have multiple checkout lanes each with its own POS workstation, such as a supermarket, or a merchant may simply have a single checkout area with one POS workstation, such as at a convenience store.

In contrast to the conventional merchant payment systems above, cross-merchant payment platforms currently exist in which a consumer's payment modalities, such as credit cards, debit cards and checking account information, are stored at a remote location that is managed by a third party "identity provider service." When a consumer sufficiently authenticates his identity at the point-of-sale of any merchant that has integrated into such a cross-merchant payment platform, such consumer's payment modalities are transmitted by the identity provider service to the merchant's POS workstation in order to consummate a payment transaction. Such cross-merchant payment systems provide for additional security at the point-of sale by requiring the consumer to submit biometric information, such as a fingerprint image, to unlock access to an "electronic wallet" containing the consumer's different payment modalities and stored at the identity provider service. Additionally, such cross-merchant payment systems also provide an opportunity to use payment options other than credit and debit card payments that can be stored in the electronic wallet (e.g., checking account information for eCheck transactions) for which back-end processing fees may be less for the merchant. Such cross-merchant payment systems are typically integrated into the merchants' POS workstations by adding hardware and software that enable biometric authentication and electronic wallet presentation.

FIG. 1 depicts a system-level block diagram for an exemplary cross-merchant payment and authentication system. As shown in FIG. 1, a client hardware device 105 resides at a checkout area, such as a checkout lane, within a merchant location. Multiple client hardware devices 105 may reside in a single merchant environment that has multiple checkout lanes.

Each client hardware device 105 is attached to a biometric sensor 110 for receiving biometric information from a consumer. The client hardware device 105 is also connected to a payment terminal 115, such as a PIN pad, and a network hub device 130 that serves as a hub for multiple checkout areas in a merchant location.

The PIN pad 115 receives information from a consumer, such as via swiping a transaction card or entering a passcode via a keypad. The PIN pad 115 is connected to a POS workstation 120, such as an ECR, which processes a consumer transaction. The POS workstation 120 is also used to forward information received from the PIN pad 115 to the network hub device 130. The POS workstation 120 can also be attached to a printer, check reader or other peripheral device useful at a point-of-sale 125.

As discussed, the network hub device 130 includes a connection to each POS workstation 120 and each client hardware device 105. The network hub device 130 is used to forward received information to server devices, such as a store controller 135, a corporate network server 140, payment processing servers 145 and 150 and an identity provider service 155.

FIG. 2 depicts a block diagram depicting the software components resident on the various devices in FIG. 1. As shown in FIG. 2, a client hardware device 105 includes software components based upon one or more application program interfaces ("APIs"), such as 205-215. The client hardware device 105 includes a software component 205 for interfacing with the biometric sensor 110 through the biometric sensor's API. Such a software component 205 enables the client hardware device 105 to request that the biometric sensor 110 activate in order to capture biometric information from a consumer. The client hardware device 105 also includes a software component 210 for interfacing, via a commonly understood API, with the complementary software component 220 of the PIN pad 115. Such a software component 210 enables the client hardware device 105 to receive requests from the PIN pad 115 to capture biometric information from the biometric sensor 110, receive and transmit information received from the consumer from the PIN pad 115 to the identity provider service 155, and transmit information received from the identity provider service 155 (e.g., consumer account information) to the PIN pad 115. The client hardware device 105 also includes a software component 215 for interfacing, via a commonly understood API, with the complementary software component 225 of the identity provider service 155. Such software component 215 enables the client hardware device 105 to communicate with the identity provider service to authenticate a consumer biometric information and to receive a consumer's electronic wallet information.

For example, in one communication process flow of an architecture under FIG. 1, the client hardware device 105 may be requested by the PIN pad 115 to request biometric information, such as a fingerprint image, to be captured by the biometric sensor 110. The client hardware device 105 receives the request and activates the biometric sensor 110 to capture the fingerprint image. The client hardware device 105 receives the image from the biometric sensor 110 and generates a biometric template (i.e., an extracted feature set of minutiae points) from the fingerprint image or alternatively, the biometric sensor 110 generates the biometric template itself and transmits the template to the client hardware device 105. The client hardware device 105 requests and receives consumer identifying information, such as a phone number, identification number or any other alphanumeric sequence, from the PIN pad 115 and communicates the biometric template and the consumer identifying information to the identity provider service 155 (optionally using encryption and decryption algorithms). Authentication information and/or authorized payment information can be retrieved by the client hardware device 105 from the identity provider service 155 if the biometric template and consumer identifying information match a user profile and thus unlock such user's electronic wallet.

For example, in such a conventional cross-merchant payment system that includes a biometric sensor for authentication purposes, a cashier processes items for purchase at a POS workstation 120. Once a total purchase price has been generated, the POS workstation 120 sends a signal to the PIN pad 115 to prompt a user for a payment method. If the user requests that biometric information be used (e.g., to obviate the necessity of providing a credit card or other payment token), the PIN pad 115 communicates with the client hardware device 105 to request that the biometric sensor 110 be turned on. The PIN pad 115 might also display a prompt for the user to, for example, place a finger on the biometric sensor 110. A fingerprint image is captured by the biometric sensor 110 and transmitted to the client hardware device 105 (or alternatively, the biometric sensor 110 converts the captured fingerprint image to a template and transmits the template to the client hardware device for storage). The PIN pad 115 might then request that the user enter a number into the PIN pad 115, which the PIN pad 115 then forwards to the client hardware device 105. If not already generated by the biometric sensor 110, the client hardware device 105 then generates a biometric template based on the fingerprint image and transmits the template and the number to the identity provider service 155 via one or more network devices, such as a hub 130. The template and number can be encrypted prior to transmission. The identity provider service 155 then compares the template with one or more stored registration templates to determine if a match occurs. The number can be used to reduce the number of stored registration templates with which the template is compared in order to decrease processing time. Each user might have a unique number such that the template need only be compared with a single stored registration template for verification purposes. If a match occurs, the identity provider service 155 sends an electronic wallet associated with the matched stored registration template to the client hardware device 105. The electronic wallet can be encrypted prior to transmission. The client hardware device 105 can forward a representation of wallet items (e.g., representations of one or more credit cards or debit cards, etc.) to the PIN pad 115 to be displayed to the consumer. Upon a selection of a particular payment option (e.g., credit card) the PIN pad 115 requests the client hardware device 105 to provide the associated payment account information (e.g., credit card number) and subsequently forward the payment account information to the POS workstation 120. In this manner, the above process emulates, for example, a magnetic card swipe to the PIN pad 115 and POS workstation 120. Normal credit processing can then be performed using the POS workstation 120 to access a card/payment processing server 145.

One problem with such cross-merchant payment systems is that each checkout area in a merchant environment requires a substantial amount of hardware. For example, a client hardware device 105, such as the one shown in FIG. 1, requires a processor, a coupled biometric sensor and a power cable. Additionally, numerous connections are required for a checkout area having such a cross-merchant payment system. For example, as illustrated in FIG. 1, RS-232 connections are required between the client hardware device 105 and the PIN pad 115. Moreover, an Ethernet connection exists between the client hardware device 105 and the network hub device 130. Each client hardware device and associated cables incurs an additional expense from the merchant on a per checkout area basis. Additionally, security mechanisms such as cryptographic keys, encryption algorithms and tamper proof designs for the devices must also be developed, installed and maintained at each such checkout area. As such, reducing the number of hardware devices and cables per checkout area could significantly reduce a merchant's financial and maintenance overhead in implementing such a cross-merchant payment system.

What is needed is a method and system for reducing the amount of hardware required for a biometrically enhanced checkout area for the implementation of a cross-merchant payment system at a merchant location. The present disclosure is directed to solving one or more of the above listed problems.

SUMMARY

In an embodiment, a system for performing authentication may include a shared central processing server residing at a merchant location, a plurality of software components, and an identity provider service configured to communicate with the shared central processing server. The shared central processing server may be configured to communicate with a plurality of point-of-sale (POS) workstations residing at the merchant location. The shared central processing server may also be configured to receive first biometric information from each POS workstation. Each software component may reside in a corresponding POS workstation. Each software component may include code for communicating with a biometric sensor to receive second biometric information. Each corresponding POS workstation may be in communication with such a biometric sensor. The identity provider service may store registered biometric information and compare third biometric information received from the shared central processing server with one or more of the stored registered biometric information.

In an embodiment, a method of performing electronic wallet presentation may include receiving a plurality of biometric information from a plurality of checkout areas. Each checkout area may be located at a merchant location. Each biometric information may be associated with a transaction performed at a corresponding checkout area. The method may further include receiving an electronic wallet corresponding to a consumer for a transaction, determining a checkout area performing the transaction associated with the electronic wallet, and transmitting a representation of at least a portion of the electronic wallet to the checkout area.

In an embodiment, a computer-readable storage medium may contain one or more programming instructions for performing a method for performing electronic wallet presentation. The method may include receiving a plurality of biometric information from a plurality of checkout areas. Each checkout area may be located at a merchant location. Each biometric information may be associated with a transaction performed at a corresponding checkout area. The method may further include receiving an electronic wallet corresponding to a consumer for a transaction, determining a checkout area performing the transaction associated with the electronic wallet, and transmitting a representation of at least a portion of the electronic wallet to the checkout area.

BRIEF DESCRIPTION OF THE DRAWINGS

Aspects, features, benefits and advantages of the disclosed embodiments will be apparent with regard to the following description, appended claims and accompanying drawings where:

DETAILED DESCRIPTION

In an embodiment, the amount of additional hardware required for a checkout area may be substantially reduced. For example, in a checkout lane for the implementation of biometrically enhanced cross-merchant payment system, only a biometric sensor, such as a fingerprint sensor, a retinal scanner, a voice recorder or the like, may need to be added to a conventional non-biometric, non-cross-merchant checkout environment. The biometric sensor may be in communication with the POS workstation via, for example, a Universal Serial Bus ("USB") port. The POS workstation and/or PIN pad may include additional software components to control operation of the biometric sensor and to communicate with the identity service provider. In an embodiment, the biometric sensor may merely require a connection to the POS workstation, and not LAN and/or power connections.

Figure 3:
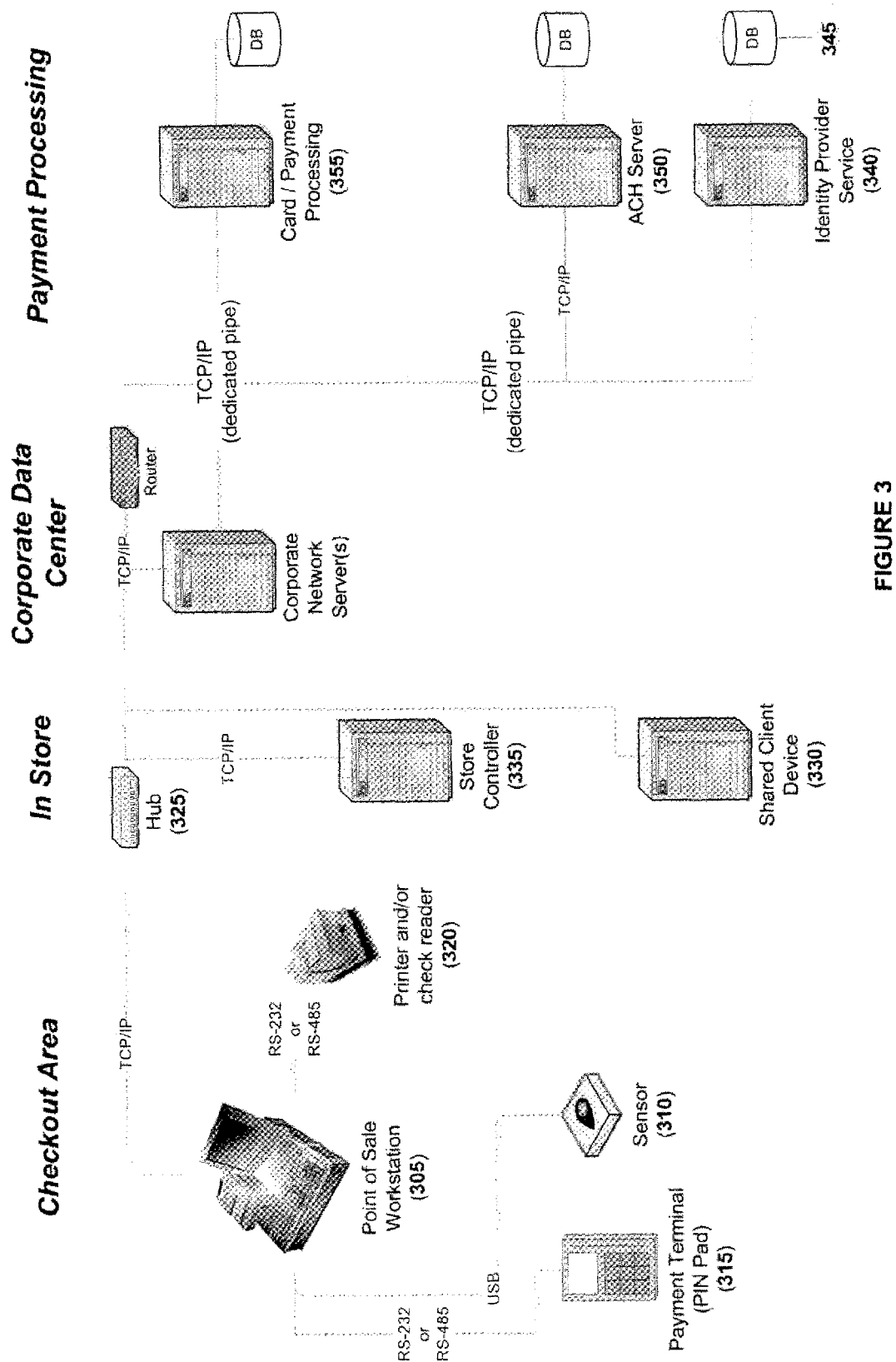
FIG. 3 depicts a block diagram for an exemplary cross-merchant payment and authentication system according to an embodiment.

FIG. 3 depicts a block diagram for an exemplary cross-merchant payment and authentication system according to an embodiment. As shown in FIG. 3, each checkout area, such as a checkout lane of a merchant location, may include a POS workstation 305, a biometric sensor 310, a payment terminal 315 and one or more printers, scanner devices or other peripheral devices useful at a point-of-sale 320. The POS workstation 305 may include a "thin client software" component for interfacing with the biometric sensor 310, which may be connected to a port of the POS workstation, and for interfacing with the shared client device 330 further described below. For example, the biometric sensor 310 may be connected to the POS workstation 305 via a USB connection. The biometric sensor 310 may include one or more of a fingerprint sensor, a retinal scanner, a voice recorder and/or any other device for accepting biometric information from a consumer.

Biometric information (e.g., a fingerprint image, a biometric template and/or any other representation of a biometric image) received by the POS workstation 305 from the biometric sensor 310 may be forwarded to a shared client device 330 by the thin-client software installed on the POS workstations 305. The shared client device 330 may operate as a shared central processing server that is located at the merchant location and provides biometric processing and authentication communication capabilities to all POS workstations 305 at the location. In an alternative embodiment, the shared client device 330 may be integrated as a software component into a hardware server that also serves as a store controller 335.

The shared client device 330 may communicate with the thin-client software on a merchant's POS workstations 305 in order to provide or obtain information to or from the PIN pad 315 and/or biometric sensor 310. The shared client device 330 may also manage communication between the merchant location and the identity provider service 340. All data and communication to and from the shared client device may be encrypted and decrypted consistent with encryption techniques known to those with ordinary skill in the art. For example and without limitation, the data may be secured using the Secure Sockets Layer ("SSL") protocol and/or any other protocol used for securely transmitting documents via a data network. In addition, the shared client device 330 may provide a scalable software distribution mechanism by receiving and distributing thin-client software upgrades for POS workstations 305. The shared client device 330 may further provide a platform for loyalty and/or check cashing applications to be performed at a POS workstation 305. Enabling such applications may merely require downloading additional thin-client software components to the POS workstation 305 as required. Additional applications, such as enrollment, credit authorization, and the like may also be performed via the shared client device 330. The shared client device 330 may also provide a platform for other biometric applications, such as time and attendance functions for merchant employees, manager override functions, cashier login, pharmacy processing and the like.

Figure 1:
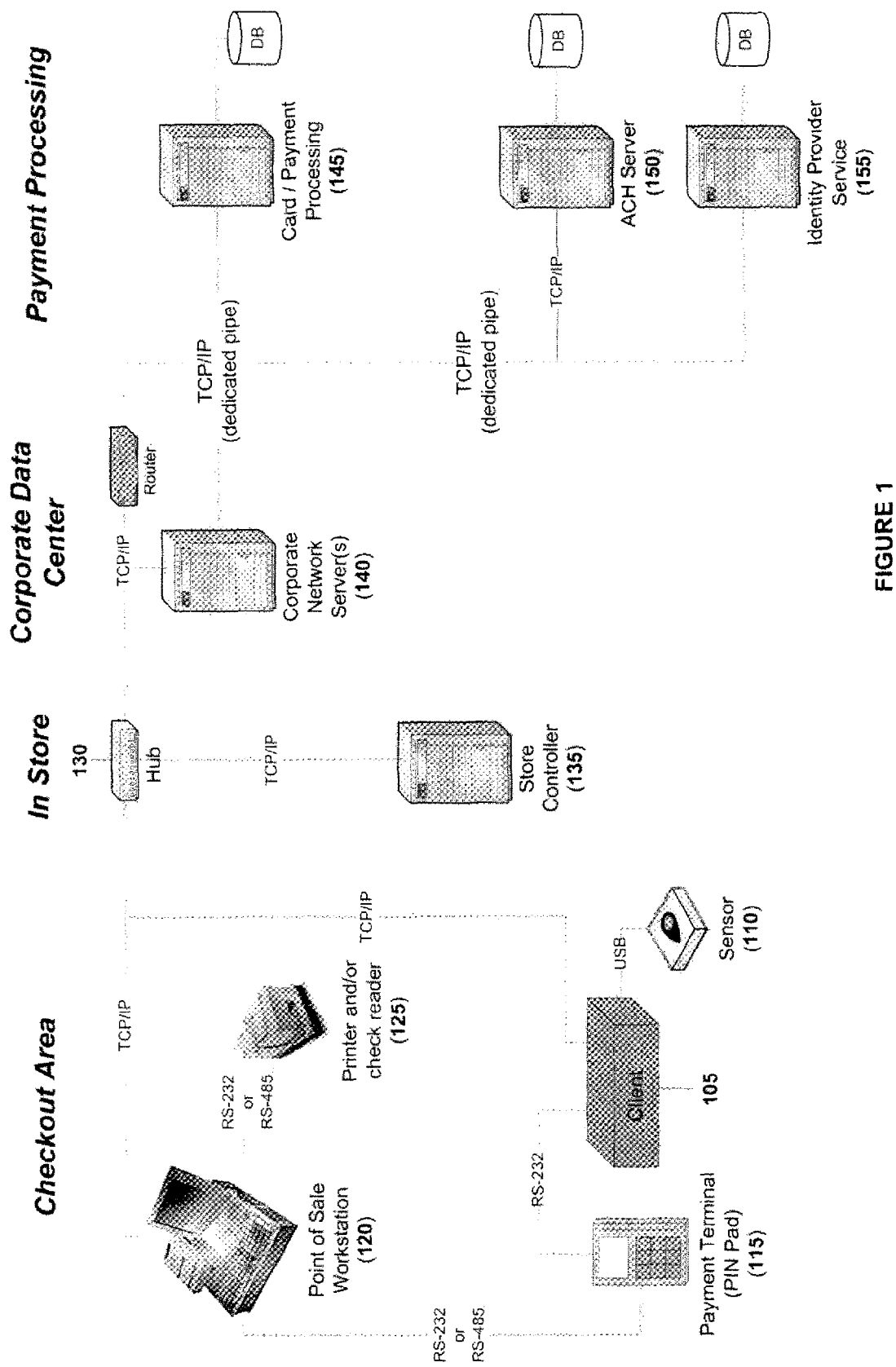
FIG. 1 depicts a block diagram for a conventional cross-merchant payment and authentication system.

The identity provider service 340 is similar to the identity provider service 155 in FIG. 1 and may interact with the shared client device 330 via a communication network and one or more routers, switches and/or other telecommunications devices and a data network, such as an intranet and/or the Internet. The identity provider service 340 may include a database 345, for example, for the storage of consumers' registration biometric templates and/or images. As discussed for the identity provider service 155 in FIG. 1, the identity provider service 340 may determine whether a user profile match exists for a biometric template and consumer identifying information provided by a consumer at a point-of-sale at a merchant location.

Figure 4:
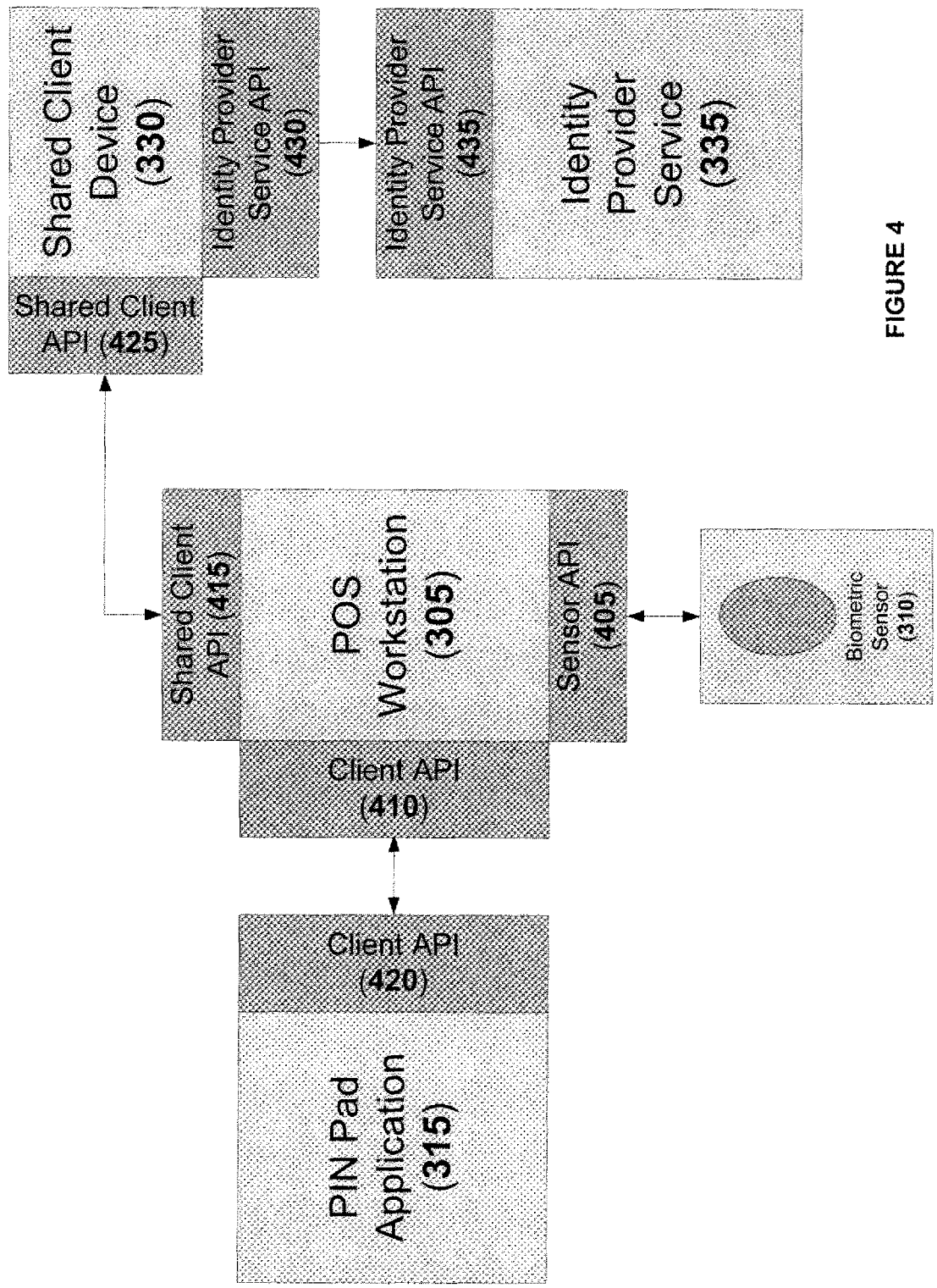
FIG. 4 depicts a block diagram for an exemplary POS workstation according to an embodiment.

FIG. 4 depicts a block diagram for an exemplary POS workstation 305 according to an embodiment. The POS workstation 305 may include similar features to the POS workstation 120 in FIG. 2 as well as the additional thin-client software discussed previously for interfacing with the biometric sensor 310 and shared client device 330. By providing a POS workstation 305 with such thin-client software, the client hardware device 105 shown in FIG. 1 may be eliminated from each checkout area. The thin-client software residing on the POS workstation 305 may be capable of interacting with (1) the biometric sensor 310 through a common sensor API 405, (2) the PIN pad 315 through a common payment terminal API 410 and 420, and (3) the shared client device 330 through a common shared client API 415 and 425. In addition, the shared client device 330 may interact with the identity provider service 340 through a common shared identity provider service API 430 and 435. In an embodiment with a plurality of POS workstations 305, each in its own checkout area (e.g., multiple lane checkouts at the merchant location), each such POS workstation 305 may be coupled, via the hub 325, for example, to the same shared client device 330 located in the back of the merchant location and serving as a central server to communicate with the identity provider service 340.

Figure 5:
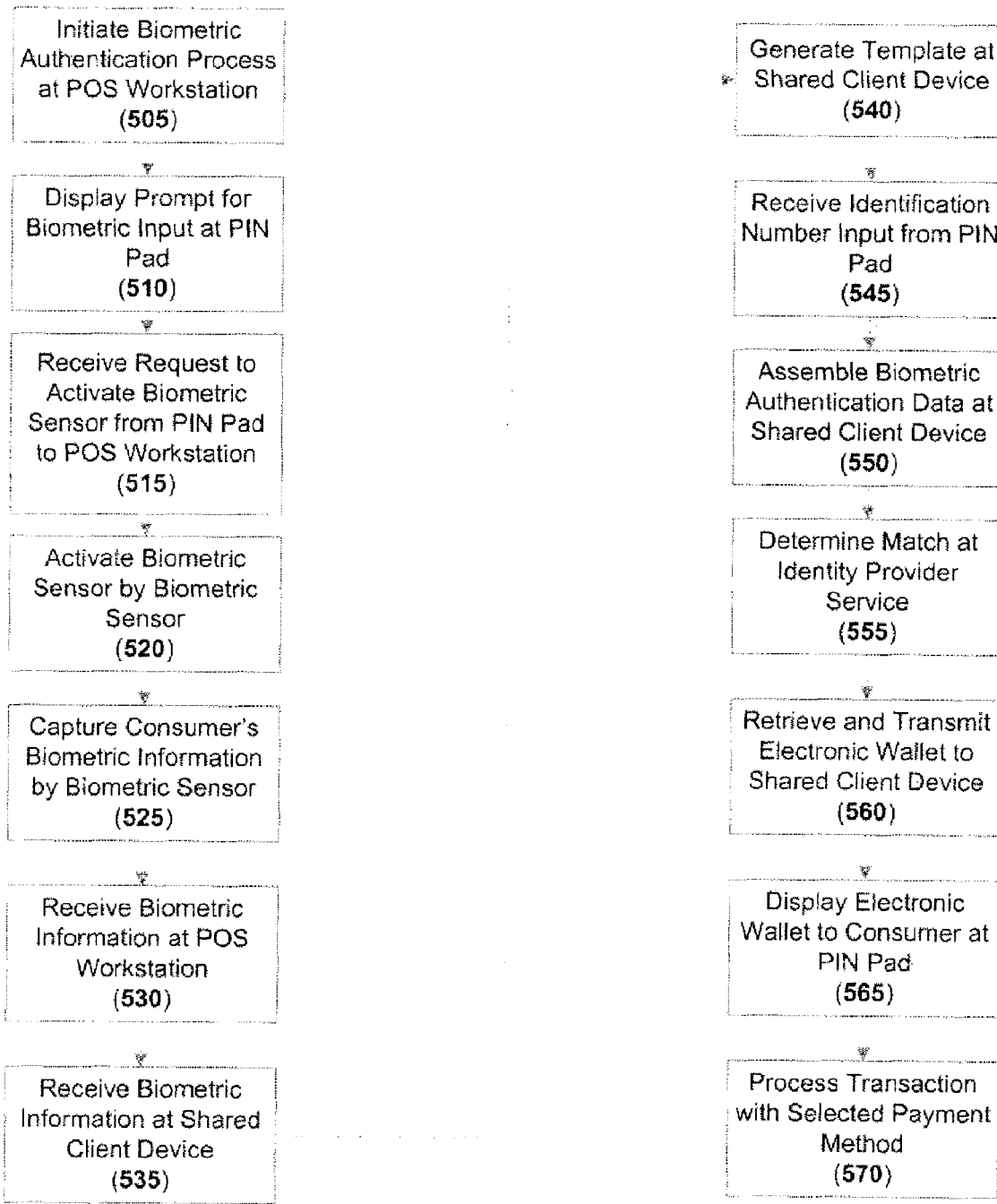
FIG. 5 depicts an exemplary method for performing biometric authentication and wallet presentation according to an embodiment.

FIG. 5 depicts an exemplary method for performing biometric authentication and wallet presentation according to an embodiment under the architectures set forth in FIGS. 3 and 4. A biometric authentication process may be initiated (Step 505) in a plurality of ways, although a particular system may only allow initiation of the process in one way. In an embodiment, the merchant's employee may initiate biometric authentication by pressing a key on a POS workstation 305 that causes the PIN pad 315 to display an option for biometric authentication payment. A consumer may then select the biometric authentication payment option on the PIN pad 315 to initiate the process. Other methods of initiating a biometric authentication process may also be performed within the scope of this disclosure and will be apparent to those of ordinary skill in the art.

Once a biometrically authenticated payment option has been selected, the PIN pad 315 may display (Step 510) a prompt for the consumer to provide biometric information via the biometric sensor 310. The thin-client software at the POS workstation 305 may receive a request from the PIN pad 315 to activate (Step 515) the biometric sensor 310 and then subsequently send a request to the biometric sensor 310 to activate and capture (Step 520) biometric information from the consumer. The consumer may then place a finger on a biometric fingerprint sensor. Additionally or alternately, the consumer may position one or both eyes in front of a retinal scanner and/or speak a phrase into a sound capturing device. Other methods of obtaining biometric information may also be performed within the scope of this disclosure. In an embodiment, a plurality of apparatuses may be used to obtain biometric information from the consumer.

The biometric sensor 310 may then capture (Step 525) the consumer's biometric information, such as a fingerprint image, and transmit it to the POS workstation 305 in response to the request of the POS workstation 305 in Step 520. The POS workstation 305 may then receive (Step 530) the fingerprint image from the biometric sensor 310. In an alternative embodiment, the biometric sensor 310 may convert the fingerprint image into a biometric template prior to transmission in Step 530. If the biometric sensor does not perform the conversion itself, then, in yet another alternative embodiment, the thin-client software at the POS workstation 305 may convert the fingerprint image into a biometric template. Ultimately, the POS workstation 305 may transmit the biometric information (template or captured image) to the shared client device 330 (Step 535). In an embodiment in which the biometric information received by the shared client device 330 is a captured image rather than a biometric template, the shared client device 330 may create (Step 540) the biometric template from the captured biometric image received from the POS workstation 305.

Similar to the processes described above in reference to FIGS. 1 and 2, the PIN pad 315 may additionally display a prompt for consumer identifying information, such as a phone number or other identification number or alphanumeric sequence. The consumer may enter (Step 545) such an identification number into the PIN pad 315. The PIN pad 315 may transmit the identification to the POS workstation 305, which sends the identification number to the shared client device 330.

Figure 2:
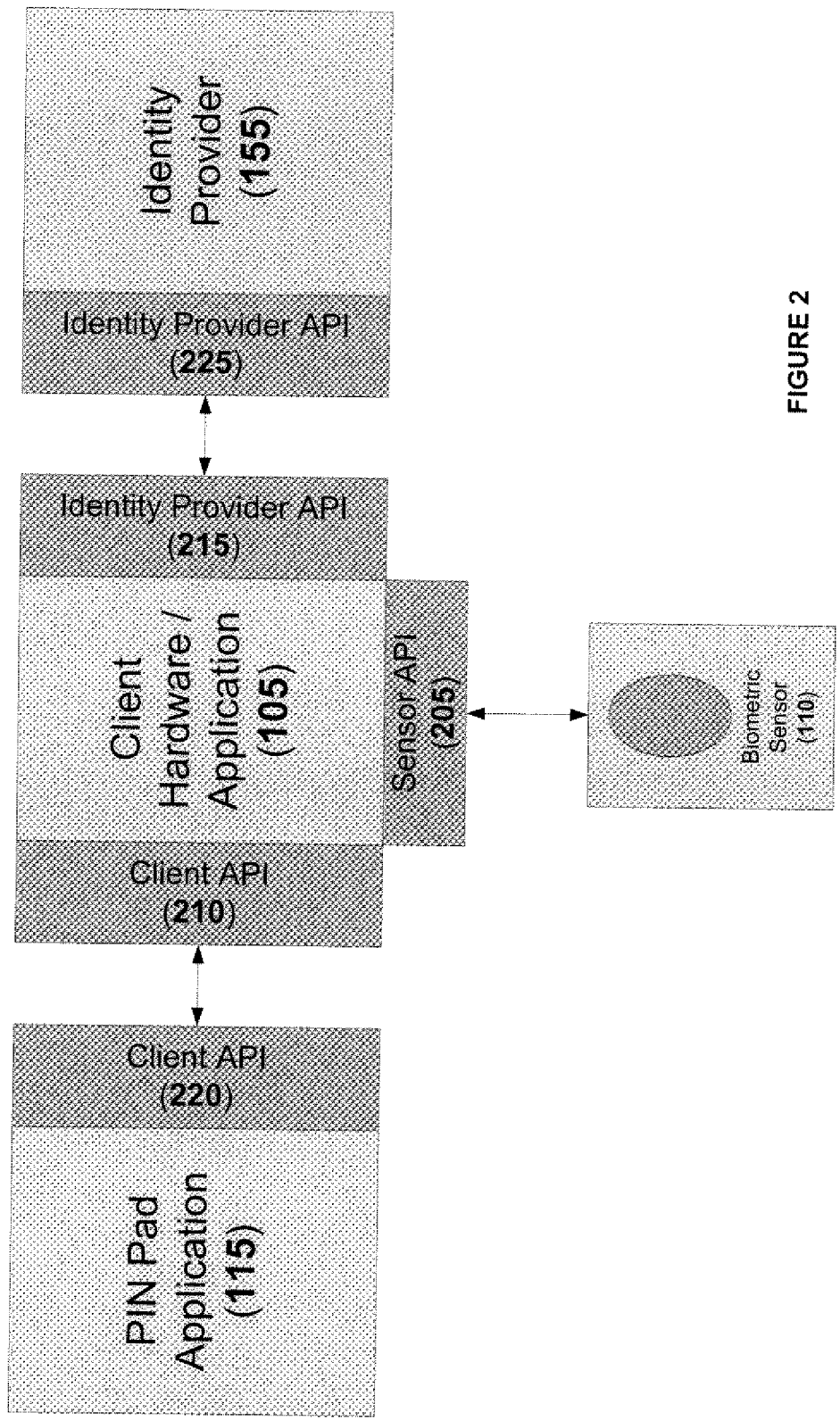
FIG. 2 depicts a block diagram for a conventional hardware/software device.

Similar to the client hardware device 105 in FIGS. 1 and 2, the shared client device 330 may assemble (Step 550) data pertaining to biometric authentication for transmission to the identity provider service 340. The data may include, for example and without limitation, the biometric template and the consumer identifying information (e.g., identification number). Additional and/or alternate information may be transmitted to the identity provider service 340 within the scope of this disclosure. The assembled data may be securely transmitted using, for example, an encryption protocol, such as SSL and may be transmitted to the identity provider service 340 via a communication network, such as an intranet and/or the Internet.

The identity provider service 340 may receive the assembled data transmitted from the shared client device 330. The identity provider service 340 may determine (Step 555) a match between at least a portion of the assembled data (e.g., the biometric template and the consumer identifying information) and stored information (e.g., stored biometric template and consumer identification number). Such a determination may be made in a similar manner as described for the identity provider service 155 in FIG. 1. If a match is found, the identity provider service 340 may retrieve an electronic wallet associated with the matched stored biometric template and transmit (Step 560) the wallet to the shared client device 330. The electronic wallet may be transmitted by the identity provider service 340 in an encrypted format, and the shared client device 330 may decrypt at least a portion of the information pertaining to the electronic wallet (e.g., payment modalities). A representation of at least a portion of the information contained in the electronic wallet may then be routed to the POS workstation 305 corresponding to the transaction. In order to route the portions of the electronic wallet to the appropriate POS workstation 305 in an embodiment with multiple checkout areas at a merchant location, the shared client device 330 may maintain a data structure that keeps track of communication sessions and associates a checkout area (e.g., by using a POS workstation identification number, etc.) with each communication session. The development and formation of such data structures will be known to those with ordinary skill in the art.

Information associated with the electronic wallet may then be forwarded by the POS workstation 305 to the PIN pad 315 and displayed (Step 565), for example, as a menu of payment options on the PIN pad. The consumer may select one of the payment options by, for examples pressing a button on or otherwise supplying information to the PIN pad 315. The selected payment option may then be forwarded to the POS workstation 305 which may have received the actual payment account information related to the selected payment option from the shared client device 330 in Step 565. In such an embodiment, the POS workstation 305 is able to forward transaction payment details, including the payment account information to the payment processors 350 or 355 for processing. Alternatively, the actual payment account information related to the selected payment option may not have been forwarded to the POS workstation 305 by the shared client device 330. In such an embodiment, software at the POS workstation 305 may forward the selected payment option received from the PIN pad 315 to the shared client device 330, which then extracts the associated payment account information from the electronic wallet received in Step 560 and forwards it to the POS workstation 305 in order to enable the POS workstation 305 to provide the payment processors 350 and 355 with sufficient transaction details, including the payment account information. Alternatively, the shared client device 330 may keep the account information, obtain the additional transaction details from the POS workstation 305 and directly communicate with the payment processors 350 or 355 in order to process the transaction Once the transaction is completed, the POS workstation 305 and shared client device 330 may purge their cached information (e.g., payment account information) relating to a consumer's electronic wallet from their memories as a security precaution.

Figure 6:
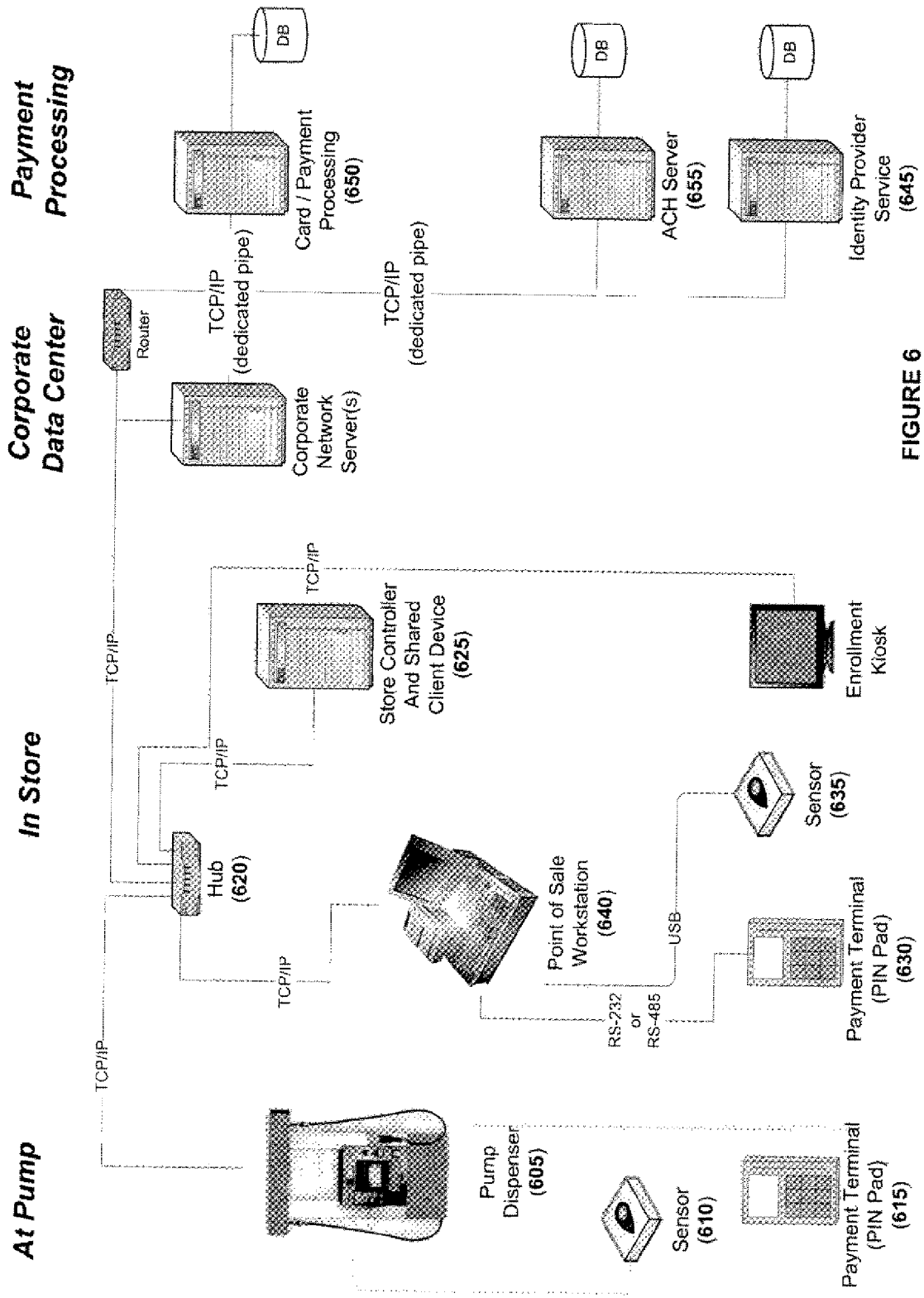
FIG. 6 depicts a block diagram for an exemplary cross-merchant payment and authentication for a fueling station embodiment.

FIG. 6 depicts a block diagram for a fueling station embodiment. As depicted, in such an embodiment, the multiple lanes of fueling dispensers serve as the equivalent of multiple checkout areas in a supermarket. An additional checkout area would also be present in the convenience store located at the fueling station. As shown in FIG. 6, a fueling dispenser 605 may include an integrated PIN pad 610 and a biometric sensor 615. The PIN pad 610 and biometric sensor 615 may then be coupled to a store controller/shared client device server 625 through router 620 which serves as a routing hub for multiple fueling dispensers. Similarly, in the single checkout area of the actual store of the fueling station, a biometric sensor 630 and PIN pad 635 are coupled to the POS workstation 640 which is further coupled to the store controller/shared client device server 625. The single checkout area in the actual store of the fueling station, including the POS workstation 640, biometric sensor 630, and PIN pad 635, is similar in architecture and function to those checkout areas depicted in FIGS. 3 and 4. However, with respect to the pump dispensers, thin client API software components depicted in FIG. 4 that are resident in POS workstation 305 in order to interface with the PIN pad 315 and biometric sensor 310 need to be shifted or otherwise modified and duplicated in the store controller/shared client device server 625 since the store controller/shared client device server 625 now controls interaction with the PIN pad 610 and the biometric sensor 615 integrated in the fueling dispenser 605. Those with ordinary skill in the art will recognize that differing fueling station network architectures may be utilized without departing from the spirit of the invention taught herein. For example and without limitation, rather than being coupled via router 620 to the store controller/shared client device server 625, an alternative embodiment may have the PIN pad 610 and biometric sensor 615 integrated into the pump dispenser 605 coupled directly to the POS workstation 640. In such an alternative embodiment, the thin client software components present in POS workstation 305 of FIG. 3 would not need to be shifted or otherwise modified and duplicated in the store controller/shared client device server 625.

Figure 7:
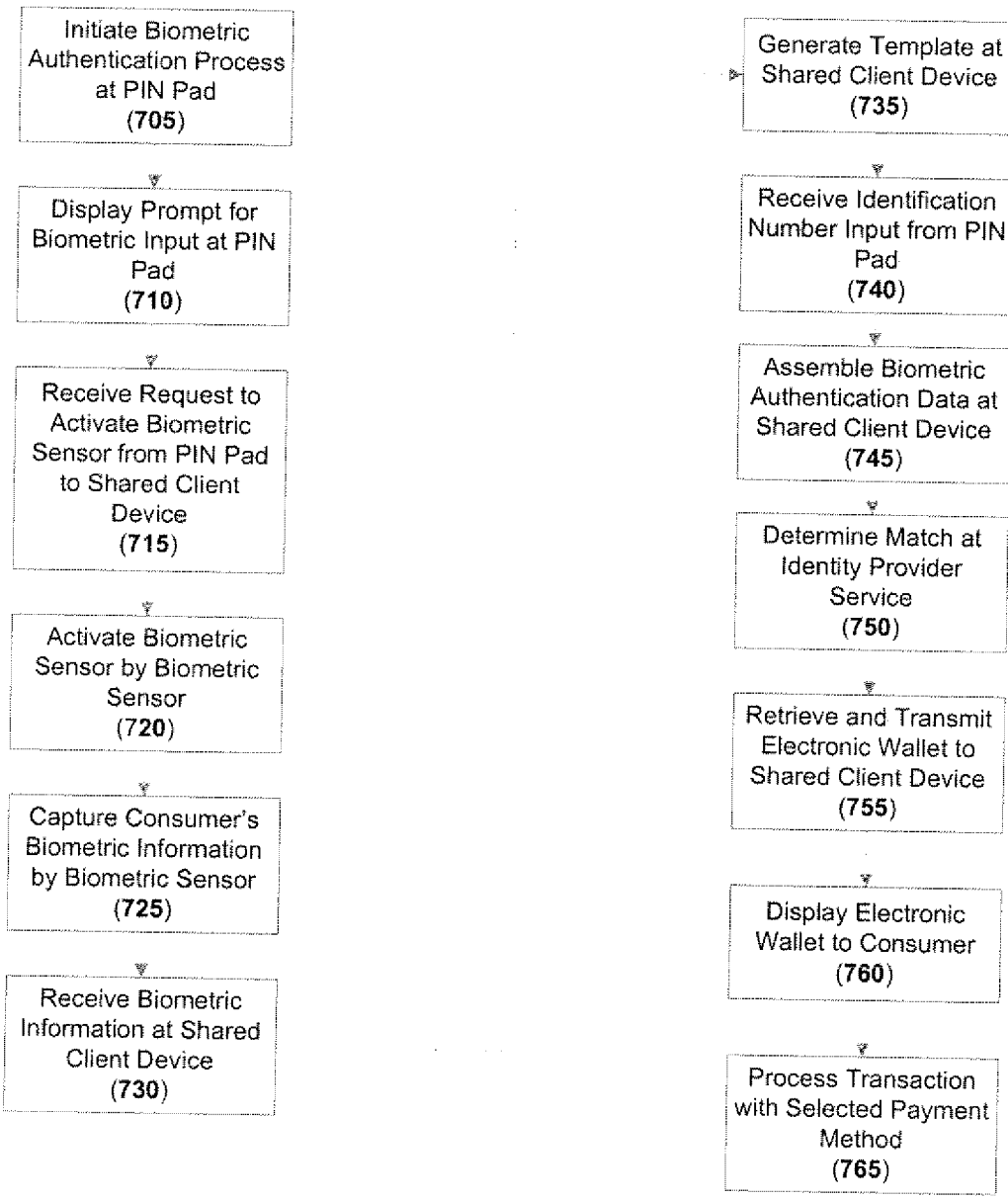
FIG. 7 depicts an exemplary method for performing biometric authentication and wallet presentation for a transaction performed at a fueling station.

FIG. 7 depicts an exemplary method for performing biometric authentication and wallet presentation for a transaction performed at a fueling station. Before permitting a consumer to dispense fuel, the consumer may initiate (Step 705) a transaction via the PIN pad 615. For example, the consumer may select a button on the PIN pad 615 corresponding to a preferred payment method which requires biometric authentication. The PIN pad 615 may display (Step 710) a prompt for the consumer to provide biometric information via the biometric sensor 610. The PIN pad 615 may simultaneously communicate with the shared client device 625 to request activation of the biometric sensor (Step 715) which is subsequently activated (Step 720) and captures the consumer's biometric information (Step 725). Such biometric information may be in the form of a fingerprint image, or alternately, a retinal scan and/or voice sample. Other methods of obtaining biometric information may also be performed within the scope of this disclosure. In an embodiment, a plurality of biometric sensors may be used to obtain biometric information from the consumer. In an embodiment, the biometric sensor 310 may be automatically enabled to capture (Step 725) biometric information from a consumer such that a PIN pad 315 need not be accessed to initiate a transaction.

The biometric sensor 610 may then transmit the fingerprint image to the shared client device 625 (Step 730). In an alternative embodiment, the biometric sensor 610 may convert the fingerprint image into a biometric template prior to transmission in Step 730. In an embodiment in which the biometric information received by the shared client device 625 is a captured biometric image rather than a biometric template, the shared client device 625 may create (Step 735) the biometric template from the captured biometric image received from the biometric sensor 610.

The PIN pad 615 may additionally display a prompt for consumer identifying information, such as a phone number or other identification number or alphanumeric sequence. The consumer may enter (Step 740) such an identification number into the PIN pad 615. The PIN pad 615 may transmit the identification number to the shared client device 625.

Similar to the client hardware device 105 in FIGS. 1 and 2, the shared client device 625 may assemble (Step 745) data pertaining to biometric authentication for transmission to the identity provider service 655. The data may include, for example and without limitation, the biometric template and the consumer identifying information (e.g., identification number). Additional and/or alternate information may be transmitted to the identity provider service 655 within the scope of this disclosure. The assembled data may be securely transmitted using, for example, an encryption protocol, such as SSL, and may be transmitted to the identity provider service 340 via a communication network, such as an intranet and/or the Internet.

The identity provider service 655 may receive the assembled data transmitted from the shared client device 625. The identity provider service 655 may determine (Step 750) a match between at least a portion of the assembled data and stored information. If a match is found, the identity provider service 655 may retrieve an electronic wallet associated with the matched stored biometric template and transmit (Step 755) the wallet to the shared client device 625. The electronic wallet may be transmitted by the identity provider service 655 in an encrypted format, and the shared client device 625 may decrypt at least a portion of the information pertaining to the electronic wallet.

Information associated with the electronic wallet may then be forwarded by the shared client device 625 to the PIN pad 615 and displayed (Step 760), for example, as a menu of payment options on the PIN pad. The consumer may select one of the payment options by, for example, pressing a button on or otherwise supplying information to the PIN pad 615. The selected payment option may then be forwarded to the shared client device 625. The shared client device 625 is able to forward transaction payment details, including the payment account information to the payment processors 645 or 650 for processing.

Biometric information may alternately be used to identify consumers without processing a consumer's payments by obtaining such a consumer's electronic wallet. For example, fuel providers have implemented pre-pay fuel pump activation in order to prevent drive-offs (i.e., filling a gas tank and driving off without paying). One conventional pre-pay option includes entering the fuel station's convenience store (or payment booth) to pay cash in advance of the transaction. This is inconvenient because if the consumer requires more or less fuel than has been paid for, the consumer is required to enter the station again to pay an additional amount or to retrieve change for the transaction.

Biometric information may be used to provide confidence to a merchant without requiring the consumer to enter the fuel station's convenience store multiple times. For example, a biometric sensor 610 may capture the consumer's biometric information, such as a fingerprint image, and transmit it to the shared client device 625 or alternatively, the POS workstation 640 which sends the biometric information to the shared client device 625. A PIN pad 615 may additionally display a prompt for consumer identifying information, such as a phone number or other identification number or alphanumeric sequence. The consumer may enter such an identification number into the PIN pad 615. The PIN pad 615 may transmit the identification number to the shared client device 625 or alternatively the POS workstation 640, which sends the identification number to the shared client device 625.

The shared client device 625 may assemble data pertaining to biometric authentication for transmission to the identity provider service 655, including, for example and without limitation, the biometric template and the consumer identifying information (e.g., identification number). If the identity provider service 655 determines a match between at least a portion of the assembled data and stored information, the identity provider service 655 may retrieve consumer identifying information (such as a name, an address, a digital picture of the consumer, purchasing history at the fueling station, etc.) associated with the matched stored biometric template and transmit the consumer identifying information to the shared client device 625. The consumer identifying information may be transmitted by the identity provider service 655 in an encrypted format, and the shared client device 625 may decrypt at least a portion of the consumer identifying information. At least a portion of the consumer identifying information may then be displayed on a terminal accessible by the merchant to assist in identifying the consumer. In this manner, the merchant may be able to determine whether it is safe to turn on the fuel dispenser for the particular consumer. In addition, the consumer may not be required to enter the station multiple times, but may only enter the station to pay at the completion of dispensing fuel.

Figure 8:
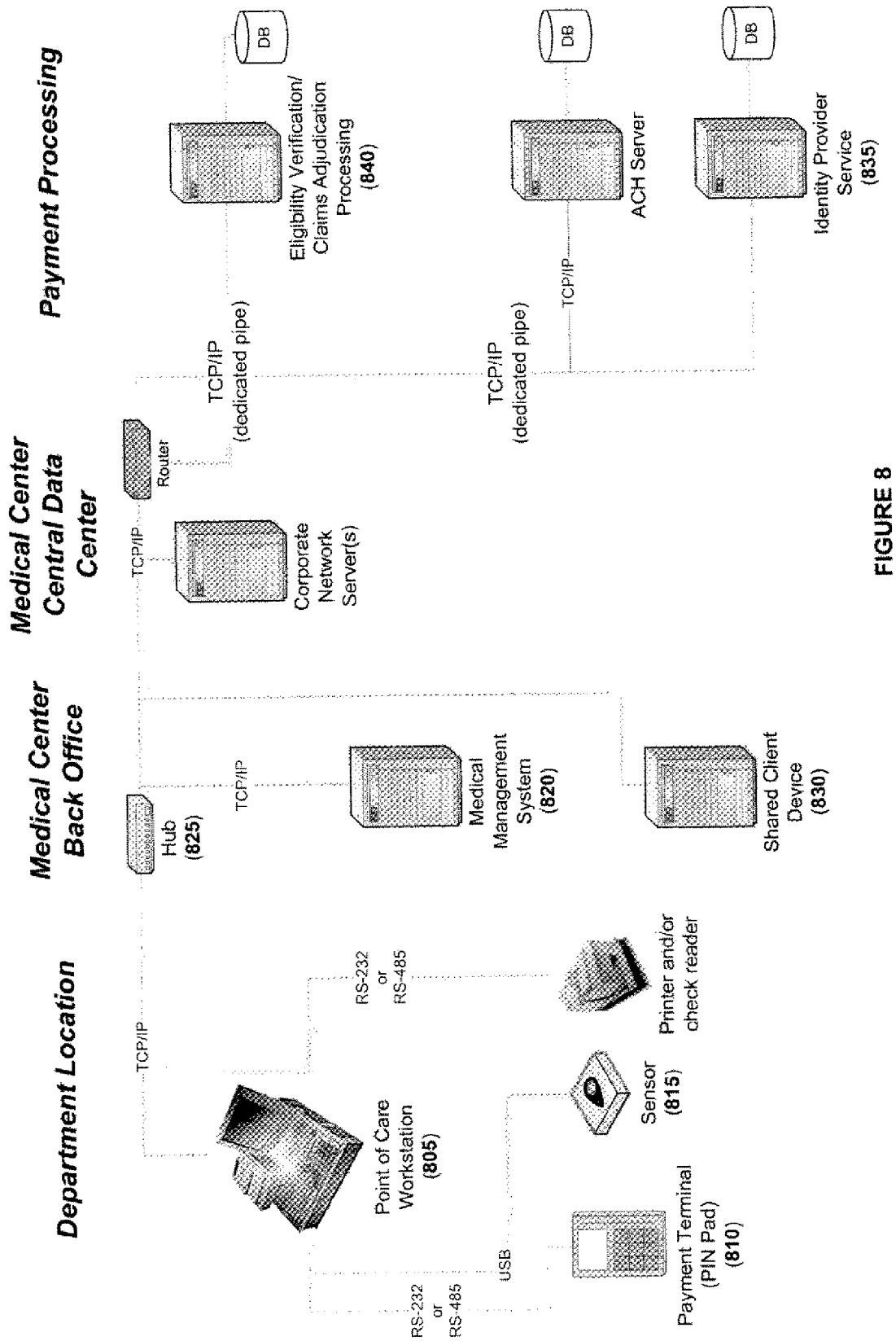
FIG. 8 depicts a block diagram for an exemplary cross-merchant payment and authentication for a medical center embodiment.

FIG. 8 depicts a block diagram for a medical center or clinic or other healthcare provider embodiment that facilitates, for example and without limitation, co-payments by patients. As depicted, in such an embodiment, the multiple check-in locations of the different departments (e.g., radiology, pharmacy, laboratory, urgent care, family medicine, etc.) located at the center serve as the equivalent of multiple checkout areas in a supermarket. As shown in FIG. 8, a point-of-care workstation 805 at each department location may be coupled to a PIN pad 810 and a biometric sensor 815. The point-of-care workstation 805 may take the form of a personal computer or other terminal that may access patient medical information stored at the center's medical management system 820. Similar to the POS workstation 305 in FIG. 3, the point-of-care workstation 805 may include a "thin client software" component for interfacing with the biometric sensor 810 and for interfacing with the shared client device 830. Similar to FIG. 3, biometric information (e.g., a fingerprint image, a biometric template and/or any other representation of a biometric image) received by the point-of-care workstation 805 from the biometric sensor 810 may be forwarded to the shared client device 830 by the thin-client software installed on the point-of-care workstation 805. The shared client device 830 operates as a shared central processing server that is located at the particular medical center and provides biometric processing and authentication communication capabilities to all point-of-care workstations 805 throughout the different department locations in the center. In an alternative embodiment, the shared client device 830 may be integrated as a software component into the medical management system 820. Additionally, the shared client device 830 may also be coupled to the medical management system 820 such that patient medical information may be utilized by the operator of the shared client device 830 (e.g., the identity provider service 835) to offer other value added services such as loyalty, drug metering, quality of service, etc. The point-of-care workstation 805 and/for may also be configured to communicate with an eligibility verification and claims adjudication processing server 840 that may be managed by a health insurance provider, for example and without limitation, to confirm a patient's eligibility for healthcare and amount of co-payment to be paid by the patient during a visit.

The process flows for a co-payment by a patient visiting a department location a at a medical center with such an system as that set forth in FIG. 8 are similar to the payment flows in FIG. 5 except that the POS workstation 305 is replaced by the point-of-care workstation 805. Additionally, in an embodiment, the correct payment amount is determined by the point-of-care workstation 805 communicating with the eligibility verification and claims adjudication processing server 840. Furthermore, the medical center embodiment of FIG. 8 further provides the opportunity to use biometric authentication techniques to confirm the insurance eligibility of the patient at a department location. For example and without limitation, upon entry to the department location, the patient may submit his biometric information to the biometric sensor 815. Similar to the process flows and descriptions relating to FIGS. 3 to 5, the patient's biometric information ultimately transmitted to the identity provider service 835, which returns to the point-of-care workstation 805 a representation of an electronic wallet. For purposes of eligibility verification, however, the electronic wallet transmitted to the point-of-care workstation 805 may include the patient's health insurance identification number. The point-of-care workstation 805 submits the health insurance identification number to the eligibility verification/claims adjudication processing server 840 which transmits a confirmation back to the point-of-care workstation 805 that the patient is eligible to receive the relevant healthcare.

Although the present invention has been described with reference to the alternative embodiments, those of ordinary skill in the art will recognize that changes may be made in form and detail without departing from the spirit and scope of this disclosure. For example and without limitation, the shared client device 330 (and the equivalent devices in other described embodiments) has been generally described as being located at a merchant location. However, those with ordinary skill in the art will recognize that such as shared client device may be located in other locations, including, without limitation, coupled to, located with or integrated into a enterprise wide (i.e., serving multiple branches of the same merchant) corporate network server or the identity provider service. Those with ordinary skill in the art will recognize that such alternative embodiments may further need additional software logic in the shared client device to distinguish communication flows from the checkout areas of multiple branches of a merchant (e.g., at the corporate network level) and additionally from multiple merchants (e.g., at the identity provider service level). Terminology used in the foregoing descriptions is for the purpose of describing the particular versions or embodiments only, and is not intended to limit the scope of the present invention which will be limited only by the appended claims. For example, the present disclosure generally relates to providing a method and system for using a POS workstation 305 with software to emulate a plurality of conventional client hardware devices 105. While the term "sensor" is used throughout the disclosure, it is not meant to limit the disclosure to any particular type of sensor, such as a biometric sensor. A sensor refers generally to any device that retrieves information. As used herein and in the appended claims, the singular forms "a," "an" and "the" include plural references unless the context clearly dictates otherwise. Similarly, the words "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions, substitutions and the like can be made without departing from the spirit of the invention and these are therefore considered to be within the scope of the invention as defined in the following claims.

What is claimed is:

1. A system, the system comprising:
a plurality of point of sale workstations equipped with biometric sensors;
a shared central processing server residing at a merchant location and configured to communicate with the plurality of point of sale workstations equipped with biometric sensors wherein the shared central processing server is configured to:
receive biometric information from a point of sale workstation,
transmit the biometric information to an identity provider service,
receive one or more payment account options and payment account information corresponding to each payment account option from the identity service provider,
wherein the payment account information enables payment processing for a transaction,
hold the received payment account information,
forward the one or more payment account options to the point of sale workstation,
receive a payment account option selection from the point of sale workstation,
identify the held payment account information corresponding to the payment account selection, and
forward the identified payment account information to the point of sale workstation, wherein the payment account information enables the merchant to directly communication with a payment processor to process payment for the transaction;
at least one software component, residing at the point of sale workstation, wherein each software component includes code for communicating with a biometric sensor to receive biometric information;
an identity provider service residing at a remote location physically separated from the merchant location and configured to communicate with the shared central processing server,
wherein the identity provider service is further configured to:
store registered biometric information,
store registered payment account information,
store payment account options corresponding to the registered payment account information,
compare biometric information received from the shared central processing server with the stored registered biometric information, and
upon a successful match of biometric information received from the shared central processing server with the stored registration biometric information, transmit the registered payment account options and the registered payment account information associated with the stored registered biometric information to the shared central processing server.

2. The system of claim 1 wherein each software component of each point-of-sale workstation is configured to receive an input from a payment terminal coupled to the point-of-sale workstation, wherein the input received from the payment terminal relates to initiating the payment.

3. The system of claim 2 wherein the payment terminal comprises a personal identification number pad.

4. The system of claim 1 wherein the biometric information received by the shared central processing server from the point-of-sale workstation comprises a fingerprint image.

5. The system of claim 4 wherein the shared central processing server is configured to convert the fingerprint image into a biometric template.

6. The system of claim 1 wherein the biometric information received by the shared central processing server from the point-of-sale workstation comprises a biometric template.

7. The system of claim 1 wherein the biometric information received by the point-of-sale workstation comprises a fingerprint image.

8. The system of claim 6 wherein the point-of-sale workstation is configured to convert the fingerprint image into a biometric template.

9. The system of claim 1 wherein the biometric information received by the point-of-sale workstation comprises a biometric template.

10. The system of claim 1 wherein each point-of-sale workstation comprises an electronic cash register.

* * * * *